(12) United States Patent
Kotake

(10) Patent No.: US 10,643,347 B2
(45) Date of Patent: May 5, 2020

(54) DEVICE FOR MEASURING POSITION AND ORIENTATION OF IMAGING APPARATUS AND METHOD THEREFOR

(71) Applicant: CANON KABUSHIKI KAISHA, Tokyo (JP)

(72) Inventor: Daisuke Kotake, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 178 days.

(21) Appl. No.: 15/441,086

(22) Filed: Feb. 23, 2017

(65) Prior Publication Data

US 2017/0249752 A1  Aug. 31, 2017

(30) Foreign Application Priority Data

Feb. 29, 2016  (JP) ................. 2016-038042

(51) Int. Cl.
*G06T 7/73* (2017.01)
(52) U.S. Cl.
CPC ...... *G06T 7/73* (2017.01); *G06T 2207/10028* (2013.01); *G06T 2207/20004* (2013.01); *G06T 2207/30244* (2013.01)
(58) Field of Classification Search
None
See application file for complete search history.

(56) References Cited

U.S. PATENT DOCUMENTS

| | | | |
|---|---|---|---|
| 9,607,388 B2 * | 3/2017 | Lin | H04N 13/221 |
| 9,761,055 B2 * | 9/2017 | Miller | G06F 3/011 |
| 9,807,359 B1 * | 10/2017 | Moule | H04N 9/3185 |
| 9,911,242 B2 * | 3/2018 | Sundaresan | G06T 15/506 |
| 2010/0208033 A1 * | 8/2010 | Edge | G06F 3/012 |
| | | | 348/46 |
| 2012/0062702 A1 * | 3/2012 | Jiang | G06T 7/74 |
| | | | 348/46 |

(Continued)

OTHER PUBLICATIONS

Tan, Wei, et al. "Robust monocular SLAM in dynamic environments." Mixed and Augmented Reality (ISMAR), 2013 IEEE International Symposium on. IEEE, 2013. (Year: 2013).*

(Continued)

*Primary Examiner* — Vu Le
*Assistant Examiner* — Samah A Beg
(74) *Attorney, Agent, or Firm* — Canon U.S.A., Inc. IP Division

(57) ABSTRACT

An information processing device includes a holding unit which holds pieces of reference data including a captured image, a position and an orientation of an imaging apparatus when the image is captured, and three-dimensional information of a feature in a space corresponding to the image in association with each other, an input unit which inputs the captured image, a derivation unit which derives a position and an orientation of the imaging apparatus when the input image is captured, an addition determination unit which determines whether a new piece of reference data is to be added, a generating unit which, if the addition determination unit determines the new piece of reference data is to be added, generates a new piece of reference data, and an updating unit which adds the generated piece of reference data and updates the pieces of reference data.

14 Claims, 9 Drawing Sheets

(56) References Cited

U.S. PATENT DOCUMENTS

| | | | | |
|---|---|---|---|---|
| 2012/0188452 | A1* | 7/2012 | Keiser | G06T 13/00 348/559 |
| 2012/0300979 | A1* | 11/2012 | Pirchheim | G06T 7/246 382/103 |
| 2012/0306847 | A1* | 12/2012 | Lim | G06K 9/00744 345/418 |
| 2013/0147789 | A1* | 6/2013 | Kim | G06T 17/00 345/419 |
| 2014/0002597 | A1* | 1/2014 | Taguchi | H04N 13/275 348/43 |
| 2014/0003705 | A1* | 1/2014 | Taguchi | G06T 7/344 382/154 |
| 2014/0354685 | A1* | 12/2014 | Lazarow | G02B 27/0172 345/633 |
| 2015/0098614 | A1* | 4/2015 | Gee | G06K 9/00624 382/103 |
| 2015/0098615 | A1* | 4/2015 | Lee | G06K 9/00624 382/103 |
| 2015/0098645 | A1* | 4/2015 | Leung | G06F 17/30811 382/154 |
| 2015/0103183 | A1* | 4/2015 | Abbott | G01C 21/165 348/169 |
| 2015/0125045 | A1* | 5/2015 | Gauglitz | G06T 7/246 382/107 |
| 2015/0172626 | A1* | 6/2015 | Martini | G06T 7/0008 348/50 |
| 2015/0243080 | A1* | 8/2015 | Steinbach | G06T 7/75 345/633 |
| 2015/0262029 | A1* | 9/2015 | Pirchheim | G06K 9/52 382/103 |
| 2016/0073080 | A1* | 3/2016 | Wagner | G06T 5/006 348/47 |
| 2016/0171768 | A1* | 6/2016 | Park | G06T 19/006 348/42 |
| 2016/0179830 | A1* | 6/2016 | Schmalstieg | G06F 17/30333 707/722 |
| 2017/0148167 | A1* | 5/2017 | Aratani | G06T 7/60 |
| 2017/0154429 | A1* | 6/2017 | Moteki | G06T 7/74 |
| 2017/0161546 | A1* | 6/2017 | Cansizoglu | G06K 9/00201 |
| 2017/0161901 | A1* | 6/2017 | Cansizoglu | G06T 7/344 |
| 2017/0178352 | A1* | 6/2017 | Harmsen | G06T 7/579 |
| 2017/0316612 | A1* | 11/2017 | Moteki | G06T 7/73 |
| 2018/0217614 | A1* | 8/2018 | Salas-Moreno | B64C 39/024 |
| 2019/0355173 | A1* | 11/2019 | Gao | G06T 7/50 |

OTHER PUBLICATIONS

Pirchheim, Christian, Dieter Schmalstieg, and Gerhard Reitmayr. "Handling pure camera rotation in keyframe-based SLAM." 2013 IEEE international symposium on mixed and augmented reality (ISMAR). IEEE, 2013. (Year: 2013).*

A. Wendel, et al.—Natural landmark-based monocular localization for MAVs; Proc. 2011 IEEE International Conference on Robotics and Automation (ICRA 2011), pp. 5792-5799, 2011.

J. Engel, et al.—Large-Scale Direct SLAM with Stereo Cameras; Proc. 2015 IEEE/RSJ International Conference on Intelligent Robots and Systems, pp. 1935-1942, 2015.

Z. Zhang—A flexible new technique for camera calibration; IEEE Trans. on Pattern Analysis and Machine Intelligence, vol. 22, No. 11, pp. 1330-1334, 2000.

G. Klein, D. Murray—Improving the Agility of keyframe-Based SLAM; Proc. 10th European Conference on Computer Vision, vol. 2, pp. 802-815, 2008.

R.A. Newcombe, et al.—DTAM: Dense Tracking and Mapping in Real-Time; Proc. 13th International Conference on Computer Vision, pp. 2320-2327, 2011.

Y. Furukawa, et al.—Reconstructing Building Interiors from Images; Proc. 12th International Conference on Computer Vision, pp. 80-87, 2009.

* cited by examiner

DEVICE FOR MEASURING POSITION AND ORIENTATION OF IMAGING APPARATUS AND METHOD THEREFOR

BACKGROUND OF THE INVENTION

Field of the Invention

The present invention relates to a device for measuring a position and an orientation of an imaging apparatus and method therefor.

Description of the Related Art

Position and orientation measurements of an imaging apparatus based on image information are usable for various purposes such as positioning of a physical space and a virtual object in mixed reality/augmented reality, localization of a robot or an automobile, and three-dimensional modeling of an object and a space.

A method has been proposed which uses feature points detected from an image to measure a position and an orientation of an imaging apparatus in capturing an image (refer to A. Wendel, A. Irschara, and H. Bischof, "Natural landmark-based monocular localization for MAVs," Proc. 2011 IEEE International Conference on Robotics and Automation (ICRA 2011), pp. 5792-5799, 2011). According to this method, information regarding feature points that can be observed at a plurality of virtually defined points of view (hereinafter, called virtual points of view) along with three-dimensional coordinates of the feature points in a world coordinate system predefined in a scene are held in advance in a three-dimensional map. When an image captured by an imaging apparatus is input, feature points in the three-dimensional map corresponding to feature points detected from the captured image are searched on the basis of information regarding the feature points held with respect to each of the virtual points of view, and a position and an orientation of the imaging apparatus are calculated on the basis of correspondences between the image coordinates and the three-dimensional coordinates of the feature points.

However, in the method above, in a case where a subject imaging apparatus leaves a range predefined in a scene, the position and orientation measurements may lose the accuracy and stability because virtual points of view are arranged in the range.

SUMMARY OF THE INVENTION

According to an aspect of the present invention, an information processing device includes a holding unit configured to hold pieces of reference data including a captured image, a position and an orientation of an imaging apparatus when the image is captured, and three-dimensional information of a feature in a space corresponding to the image, the captured image, the position and the orientation, and the three-dimensional information being associated with each other, an input unit configured to input an image captured by the imaging apparatus, a derivation unit configured to derive a position and an orientation of the imaging apparatus when the input image is captured on the basis of the pieces of reference data and the input image, an addition determination unit configured to determine whether a new piece of reference data is to be added on the basis of the derived position and orientation and the pieces of reference data, a generating unit configured to, in a case where the addition determination unit determines the new piece of reference data is to be added, generate a new piece of reference data on the basis of the input image, the derived position and orientation, and three-dimensional information of a feature in one of the pieces of reference data, and an updating unit configured to add the generated piece of reference data and update the pieces of reference data.

Further features of the present invention will become apparent from the following description of exemplary embodiments with reference to the attached drawings.

DESCRIPTION OF THE EMBODIMENTS

A hardware configuration of an information processing device according to an embodiment will be described with reference to FIG. 1 before describing embodiments of the present invention.

Figure 1:
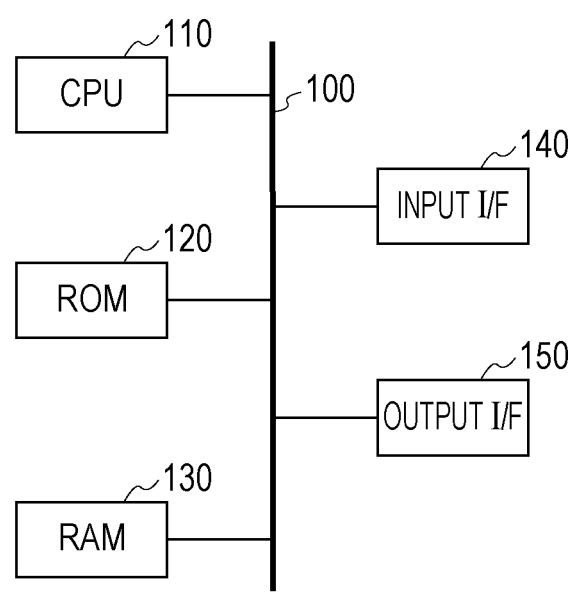
FIG. 1 illustrates a hardware configuration of an information processing device according to an embodiment.

FIG. 1 illustrates a hardware configuration of an information processing device according to an embodiment. In FIG. 1, the CPU 110 generally controls devices connected thereto via a bus 100. The CPU 110 is configured to read out and execute processing steps and a program stored in a read-only memory (ROM) 120. Processing programs and device drivers according to an embodiment as well as an operating system (OS) are stored in the ROM 120, are temporarily stored in a random access memory (RAM) 130, and may be executed by a CPU 110 as required. An input I/F 140 is usable for inputting a signal from an external device (such as a display device and an operating device) to an information processing device 1 as an input signal processable by the information processing device 1. An output I/F 150 is usable for outputting an output signal process sable by an external device (display device) to the external device (display device).

According to a first embodiment, a method according to an aspect of the present invention is applied to positioning of a physical space and a virtual object in a mixed reality system, that is, to measurement of a position and an orientation of an imaging apparatus (camera) in a physical space for use in drawing of the virtual object. A user to experience mixed reality may wear a Head-Mounted Display (HMD) to observe, through the HMD, a physical space on which a virtual object is superimposed. The HMD may include stereo cameras as an imaging apparatus, and a virtual object drawn on the basis of a position and an orientation in a physical space of the stereo cameras over an image captured by the stereo cameras for presentation to the user. A three-dimensional map of feature points in a physical space for use in measurement of a position and an orientation of an imaging apparatus may be generated in advance. When a user experiences the mixed reality, an image captured by the imaging apparatus and the three-dimensional map are used to calculate position and orientation measurements of the imaging apparatus.

According to this embodiment, an image captured while a user is experiencing mixed reality may be added as a keyframe to the three-dimensional map for use in the subsequent position-and-orientation measurement. Thus, the three-dimensional map generated in advance can be used for implementation of position-and-orientation measurement without deteriorating accuracy and stability even when the imaging apparatus leaves a range supporting the position-and-orientation measurement. The keyframe will be described below.

The position and orientation and an imaging apparatus according to this embodiment refer to six parameters including three parameters representing a position of an imaging apparatus in a world coordinate system predefine in a physical space and three parameters representing an orientation of the imaging apparatus. It is assumed here that the orientation is expressed by a rotation axis and a rotation angle and that the three parameters representing an orientation include two parameters representing a slope of the rotation axis and one parameter representing a rotation angle about the rotation axis. According to this embodiment, a position and an orientation of a left camera of the stereo cameras being an imaging apparatus are called a position and an orientation of the imaging apparatus otherwise specified. An imaging apparatus coordinate system that is a three-dimensional coordinate system predefined on an imaging apparatus is provided which includes an optical axis of the imaging apparatus as a Z axis, a horizontal direction of an image as an X axis, and a vertical direction thereof as a Y axis.

Figure 2:
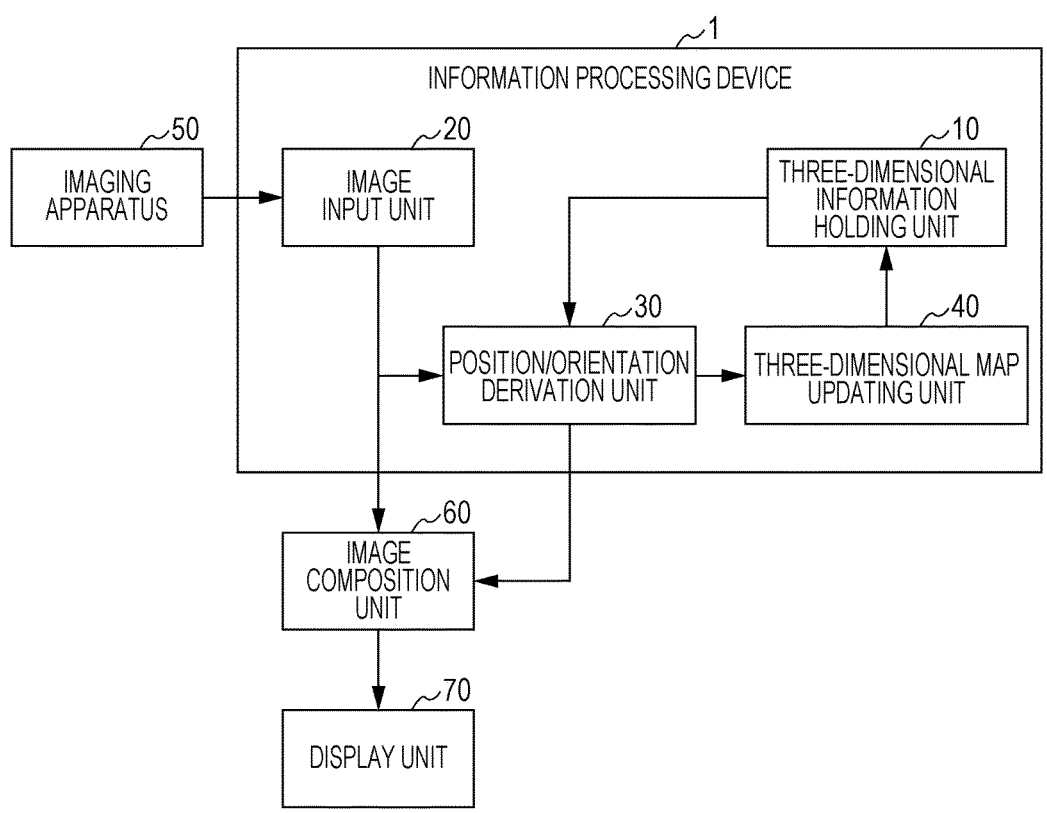
FIG. 2 illustrates a functional configuration of the information processing device.

FIG. 2 illustrates a functional configuration of the information processing device 1 according to this embodiment. The information processing device 1 includes a three-dimensional information holding unit 10, an image input unit 20, a position/orientation derivation unit 30, and a three-dimensional map updating unit 40. The image input unit 20 is connected to an imaging apparatus 50 installed in an HMD. The imaging apparatus 50 is stereo cameras. The imaging apparatus 50 will sometimes be called stereo cameras 50 below. The image input unit 20 and the position/orientation derivation unit 30 are connected to the image composition unit 60. The image composition unit 60 is connected to a display unit 70.

Figure 8:
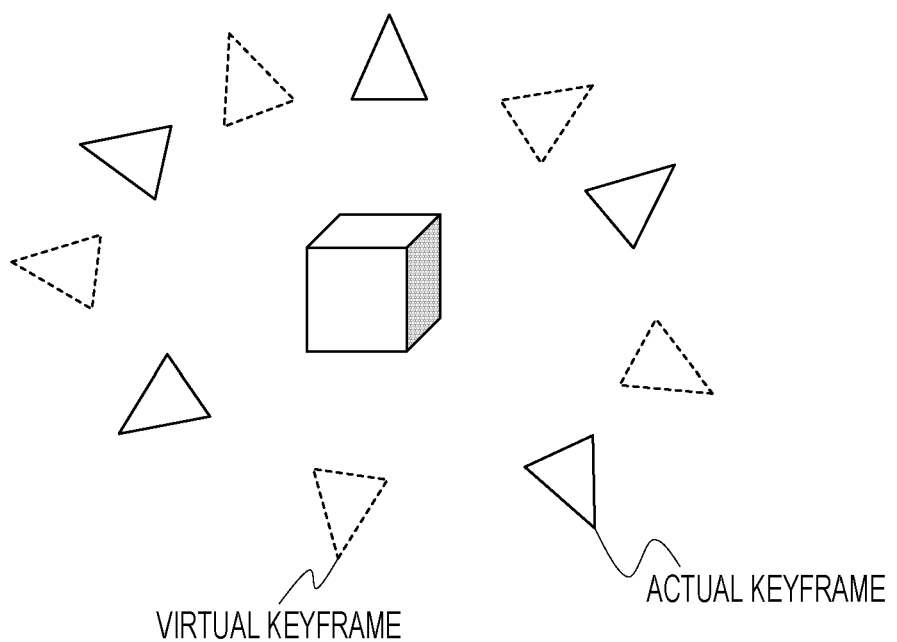
FIG. 8 illustrates a three-dimensional map in a physical space according to an embodiment.

The three-dimensional information holding unit 10 is configured to hold a three-dimensional map of a physical space to be used in the position/orientation derivation unit 30. As illustrated in FIG. 8, according to this embodiment, it is assumed that the three-dimensional map of a physical space is held as a set of keyframes. A keyframe is held in association with a captured image (grayscale image) I captured by the imaging apparatus, a depth map D having an image size equal to that of the captured image, and a variance map V. The depth map D contains pixels each holding a reciprocal number of a depth about the imaging apparatus, that is, a reciprocal number of a Z coordinate in the imaging coordinate system. The variance map V contains pixels each holding a variance of a reciprocal number of a depth about the imaging apparatus.

Hereinafter, $I(u,v)$ refers to a luminance value of a pixel at image coordinates $(u,v)$, and $D(u,v)$ refers to a reciprocal number of a depth of the pixel at the image coordinates $(u,v)$. $V(u,v)$ refers to a variance of the reciprocal number of a depth of the pixel at the image coordinates $(u,v)$. The pixel having zero (0) in $D(u,v)$ is determined as an invalid point and is not to be used for the position and orientation derivation. A keyframe has a position and an orientation in a world coordinate system of an imaging apparatus while performing an image capturing operation.

Hereinafter, such a position and an orientation will be called a "keyframe's position and orientation". A color image captured by the imaging apparatus may be converted to a grayscale image for holding. As illustrated in FIG. 8, the three-dimensional information holding unit 10 is configured to hold two keyframe types of actual keyframe and virtual keyframe. An actual keyframe is generated before a user experiences mixed reality.

This embodiment applies a method by Engel et al. (refer to J. Engel, J. Stuckler, D. Cremers, "Large-Scale Direct SLAM with Stereo Cameras," Proc. 2015 IEEE/RSJ International Conference on Intelligent Robots and Systems, pp. 1935-1942, 2015). According to the method, a three-dimensional map is generated in advance, and an actual keyframe is generated.

According to the method by Engel et al., a depth value of a pixel having a larger luminance gradient among pixels on a grayscale image is only registered with the depth map D. On the other hand, a virtual keyframe is a keyframe to be generated when a user experiences mixed reality. How a virtual keyframe is generated will be described below.

The image input unit 20 may input an image captured by the stereo cameras 50 to the position/orientation derivation unit 30. This embodiment assumes that the stereo cameras 50 captures a color image so that a virtual object is superimposed on the captured image. A color image if any input is converted to a grayscale image. A grayscale image may be input in a case where a color captured image is not required as in localization for a robot or an automobile.

The image input unit 20 may input images in time series manner (such as 30 frames per second) from the stereo cameras 50, and the information processing device 1 is configured to measure a position and an orientation of the stereo cameras in a world coordinate system when stereo images input from the image input unit 20 are captured. Hereinafter, the latest image input to the information processing device 1 will be called a current frame. An image input immediately before the current frame will be called a previous frame.

It is assumed here that intrinsic parameters (including focal lengths $f_x$ (image horizontal direction) and $f_y$ (image vertical direction), an image center position $c_x$ (image horizontal direction) and $c_y$ (image vertical direction), and a lens distortion parameter) of each of two cameras included in the stereo cameras 50 are known. For easy understanding, this embodiment assumes that the intrinsic parameters of the two cameras are the same.

The intrinsic parameters of the cameras may be calibrated in advance according to a method by Zhang (refer to Z. Zhang, "A flexible new technique for camera calibration," IEEE Trans. on Pattern Analysis and Machine Intelligence, vol. 22, no. 11, pp. 1330-1334, 2000).

It is further assumed that relative positions and orientations (hereinafter, also called extrinsic parameters) between the two cameras included in the imaging apparatus 50 are known. The extrinsic parameters of the stereo cameras may be obtained by capturing a pattern whose three-dimensional shape is known by using right and left cameras simultaneously, obtaining their positions and orientations with reference to the pattern, and converting the positions and orientations to positions and orientations with reference to the left camera of the stereo cameras. It is assumed that the intrinsic parameters and extrinsic parameters of the stereo cameras 50 are held in a memory, not illustrated.

The position/orientation derivation unit 30 is configured to derive the position and the orientation of the stereo cameras 50 in a world coordinate system on the basis of an image input from the image input unit 20 and a three-dimensional map held in the three-dimensional information holding unit 10. How such a position and an orientation are derived will be described below.

The three-dimensional map updating unit 40 is configured to generate a virtual keyframe by using the position and orientation of the stereo cameras derived by the captured image and position/orientation derivation unit 30 and add it to the three-dimensional map. How a virtual keyframe is generated will be described below. The generated virtual keyframe may be used for deriving the position and orientation of the stereo cameras along with an actual keyframe held in advance in the three-dimensional map.

The image composition unit 60 is configured to render a CG image of a virtual object by using the position and orientation of the stereo cameras derived by the position/orientation derivation unit 30 and the intrinsic and extrinsic parameters of the stereo cameras and compose the image superimposed on captured stereo images.

The display unit 70 may be an HMD and is configured to display an image composed by the image composition unit 60. According to this embodiment, the HMD is a stereo HMD which displays different images on right and left display devices so that stereoscopic views of a physical space and a virtual object can be presented to a user.

These functional units are implemented by the CPU 110 by decompressing programs stored in the ROM 120 to the RAM 130 and executing processing based on flowcharts which will be described below. For example, in a case where hardware is configured as an alternative to the software processing using the CPU 110, a computing unit or a circuit associated with the processing of the corresponding functional units may be implemented.

Figure 3:
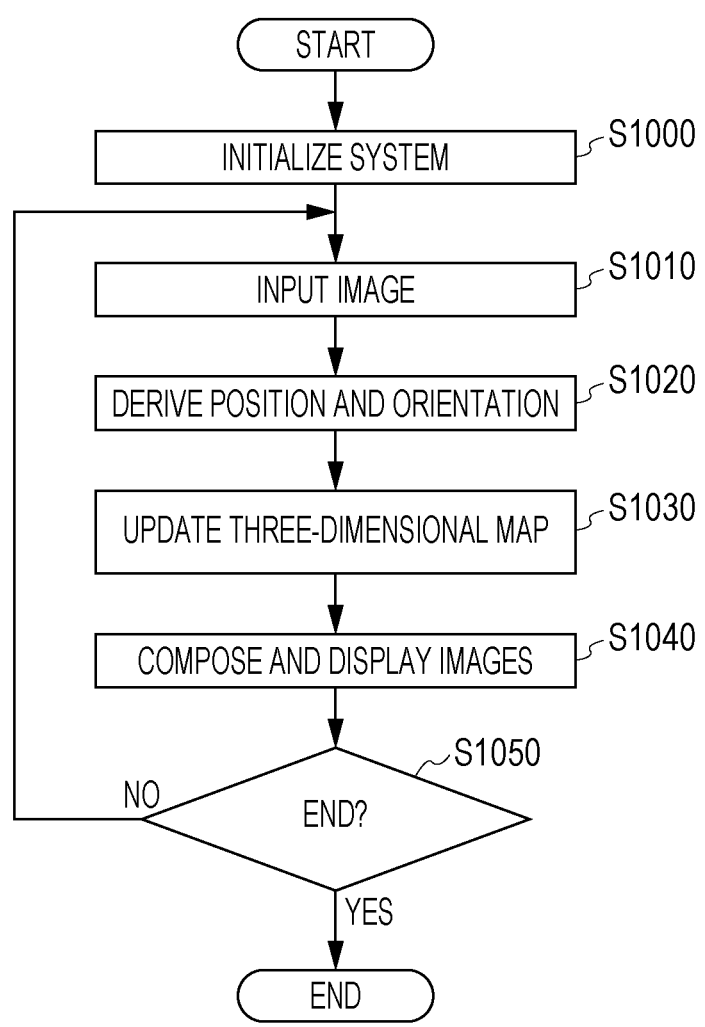
FIG. 3 is a flowchart illustrating a processing procedure for deriving a position and an orientation and updating a three-dimensional map.

Next, processing procedures for deriving a position and an orientation and for updating a three-dimensional map according to this embodiment will be described. FIG. 3 is a flowchart illustrating the processing procedures for deriving a position and an orientation and for updating a three-dimensional map according to this embodiment.

In step S1000, system initialization is performed. In the system initialization, a three-dimensional map is loaded from a storage device, not illustrated, to the three-dimensional information holding unit 10. The position/orientation derivation unit 30 sets an unmeasurement flag F to TRUE. The unmeasurement flag F having TRUE indicates that the position and orientation of the stereo cameras are not known.

In step S1010, the image input unit 20 inputs a stereo image captured by the stereo cameras 50. Because the stereo cameras capture a color image according to this embodiment, the input color image is converted to a grayscale image and is further converted by using the intrinsic parameters of the right and left cameras to an image from which an influence of a lens distortion is removed.

In step S1020, the position and orientation of the stereo cameras 50 are derived on the basis of the stereo images input from the image input unit 20 and the three-dimensional map held in the three-dimensional information holding unit 10. How the position and orientation are derived will be described below.

In step S1030, a virtual keyframe is added as necessary to update the three-dimensional map. How the three-dimensional map is updated will be described below.

In step S1040, the position and orientation of the stereo cameras 50 derived in step S1020 are used to render a CG image of a virtual object, and the CG image is superimposed on images of the stereo image for display on the display unit 70 of the HMD.

In step S1050, whether the system is to be ended or not is determined. If a command to end the system is input from a user through a mouse or a keyboard, the system is ended. Otherwise, the processing returns to step S1010, and the position-and-orientation measurement processing continues.

Details of Processing for Deriving Position and Orientation

Figure 4:
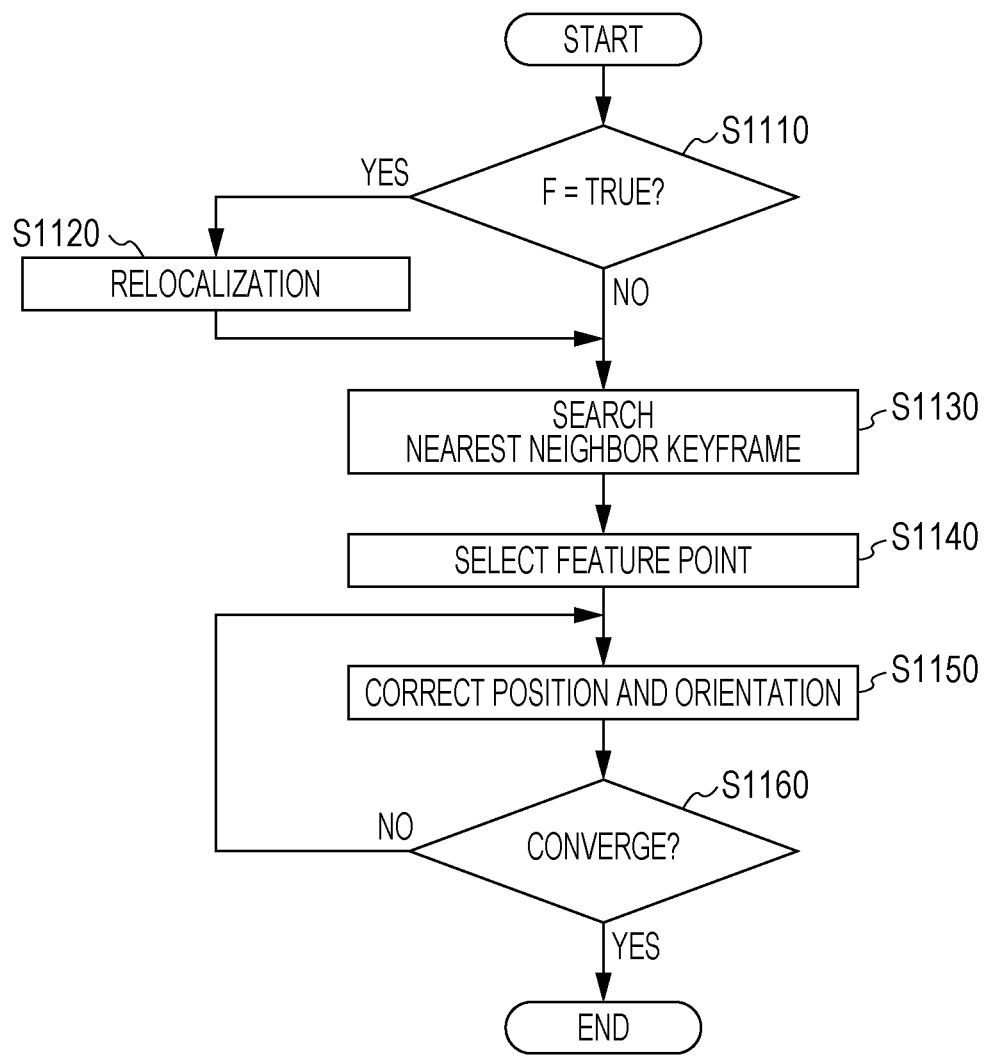
FIG. 4 is a flowchart illustrating a detail procedure for the processing of deriving a position and an orientation.

Next, the processing for deriving a position and an orientation in step S1020 will be described in detail. FIG. 4 is a flowchart illustrating a detail procedure for the processing of deriving a position and an orientation in step S1020.

In step S1110, if the unmeasurement flag F has TRUE, the processing moves to step S1120 where relocalization is performed. Otherwise, the processing moves to step S1130.

In step S1120, relocalization is performed. The term "relocalization" refers to processing for obtaining a position and an orientation of an imaging apparatus without requiring advance information regarding the position and orientation (such as a position and orientation of the imaging apparatus in a previous frame). Here, initialization processing based on the input image is performed to derive the position and orientation of the imaging apparatus 50. The relocalization is performed upon system boot-up and in a case where the position-and-orientation measurement fails during a system operation. If the relocalization succeeds, the unmeasurement flag F is changed to FALSE. The processing then moves to step S1130. Because the position and orientation of the imaging apparatus which are obtained by the relocalization may often be schematic, a position and an orientation that are more precise are derived in step S1130 and subsequent steps. Details of the relocalization will be described below.

In step S1130, the position/orientation derivation unit 30 selects a keyframe (hereinafter, called a nearest neighbor keyframe) holding a position and an orientation closest to prediction values of the position and orientation in the current frame from actual keyframes and virtual keyframes. This keyframe selection uses the position and orientation derived in the previous frame as the prediction values for the position and orientation in the current frame. However, in a case where deriving of the position and orientation in the previous frame fails and the relocalization in the current frame is performed, the position and orientation obtained by the relocalization are used as the prediction values for the current position and orientation.

According to this embodiment, a keyframe having a minimum difference between the value of a position and a prediction value therefor is selected as the nearest neighbor keyframe from keyframes having a difference between the value of an orientation and a prediction value therefor equal to or lower than a threshold Tr. This embodiment assumes that a difference between the value of an orientation and a prediction value therefor is equal to a rotation angle where a relative orientation between the prediction value for the orientation and the orientation held in the keyframe is represented by a rotation axis and a rotation angle. If no keyframe holds an orientation having a difference between the value of the orientation and a prediction value therefor equal to or lower than Tr, the threshold Tr may be increased so that the keyframe selection may be tried again. If no keyframe is found even when the threshold Tr is increased, the keyframe used in the previous frame is selected.

In step S1140, the position/orientation derivation unit 30 selects a feature point to be used for deriving a position and an orientation from the keyframe selected in step S1130. The term "feature point" refers to a pixel having a valid value in the depth map D in the selected keyframe. Hereinafter, the feature point will be called a "feature point on a/the keyframe". Because real time processing is required in a mixed reality system, a limited time period can be used for deriving a position and an orientation. The time period usable for deriving a position and an orientation depends on the number of feature points used for deriving the position and the orientation. Accordingly, a maximum value Pmax of the number of feature points to be used for deriving a position and an orientation may be defined in advance, and the maximum number Pmax of feature points are selected from the selected keyframe for deriving a position and an orientation in real time. If the number of feature points on the keyframe is lower than Pmax, all of the feature points may be selected for use so that the number of feature points equal to or lower than a predetermined maximum number may be used.

In step S1150, the position/orientation derivation unit 30 uses the feature points selected in step S1140 to correct the prediction values for the position and the orientation. According to this embodiment, a method similar to the method by Engel et al. may be used to derive a position and an orientation. In other words, the position and orientation prediction values are corrected to reduce an error between a luminance value on the input image of the calculated position and the luminance value on the grayscale image of the keyframe when the derived position and orientation are used to calculate the positions on the image of the feature points.

In step S1160, the position/orientation derivation unit 30 determines whether the position and orientation deriving has converged or not. The convergence may be determined on the basis of a result of determination on whether the error relating to the luminance value has sufficiently been reduced or not (such as whether the error is lower than a threshold or not). For example, it may be determined on the basis of a result of determination on whether a difference value between an error after one previous repeated step and an error after the current repeated step is lower than a threshold or not. If it is determined that the processing has converged, the processing in the flowchart in FIG. 4 is ended. If it is determined that the processing has not converged, the processing returns to step S1150. In step S1160, whether the position and orientation deriving fails or not may be determined. Whether the position and orientation deriving fails or not may be determined on the basis of, for example, a value of an evaluation function used for the position and orientation deriving. If it is determined that the position and orientation deriving fails, the unmeasurement flag F is changed to TRUE.

Details of Relocalization Processing

According to this embodiment, the relocalization is performed by applying a method by Klein et al (refer to G. Klein, D. Murray, "Improving the Agility of keyframe-Based SLAM," Proc. 10th European Conference on Computer Vision, vol. 2, pp. 802-815, 2008.)

In the method by Klein et al., a luminance value of each of pixels in an input image and a luminance value of each of pixels in a grayscale image of each keyframe in a three-dimensional map are compared, and the position and orientation of the imaging apparatus held by a keyframe having a smallest difference are determined as the position and orientation of the imaging apparatus while capturing the input image.

According to this embodiment, not only an actual keyframe that is generated in advance but also a virtual keyframe generated when mixed reality is experienced are to be compared with an input image to increase a range that supports the relocalization. In order to perform the relocalization at a high speed, a keyframe image may be reduced to a predetermined size in advance, and an input image may also be reduced to the size equal thereto for the comparison. As a scale for the comparison, a sum square of a luminance difference as described above may be used so that, if the sum square of the luminance difference is equal to or lower than a predetermined threshold, it may be determined that the relocalization has succeeded. If the relocalization fails, an image that is input next may be used to perform the relocalization again.

Details of Processing for Updating Three-Dimensional Map

Figure 5:
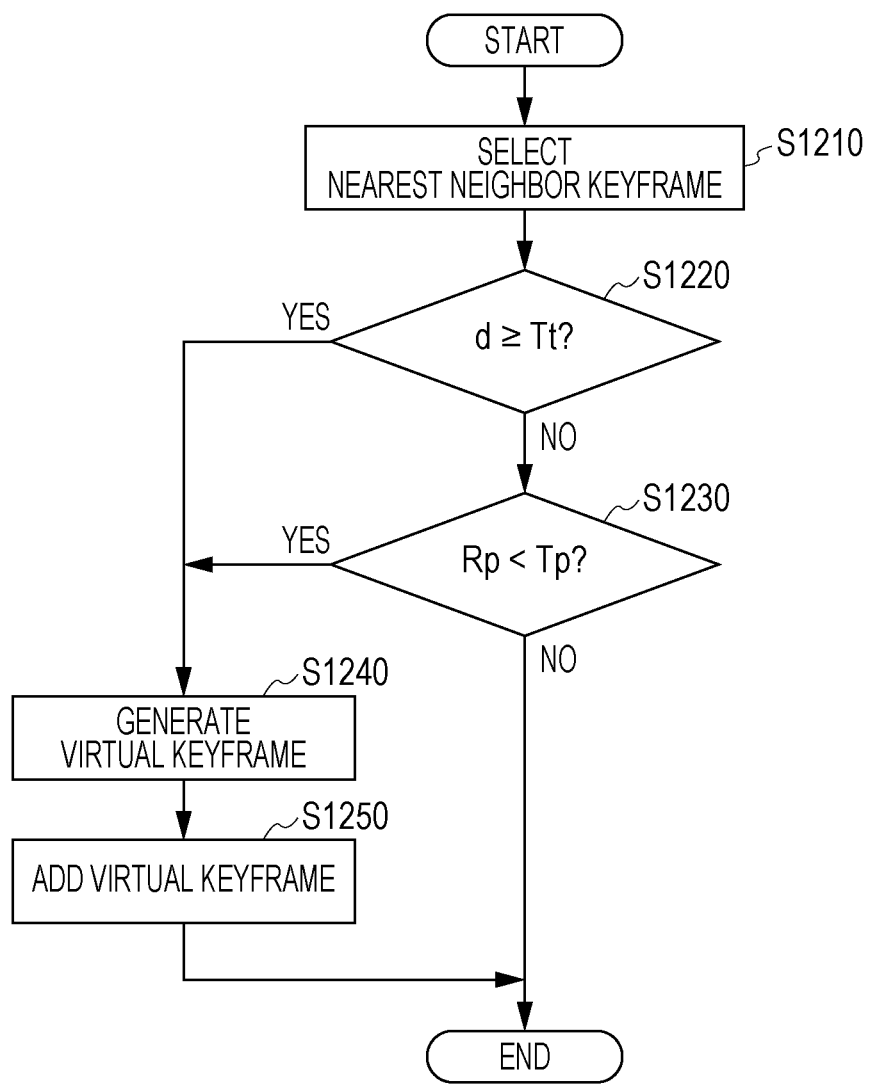
FIG. 5 is a flowchart illustrating a detail procedure of the processing for updating a three-dimensional map.

Next, details of the method for updating a three-dimensional map in step S1030 will be described. FIG. 5 is a flowchart illustrating a detail procedure for processing of updating a three-dimensional map.

In step S1210, a keyframe (nearest neighbor keyframe) holding the closest position and orientation to the position and orientation derived in step S1020 is selected from actual keyframes. Such a nearest neighbor keyframe is selected by the same method as in step S1130.

In step S1220, on the basis of a difference between the position of the imaging apparatus while imaging the current frame, which is derived in step S1020, and the position of the imaging apparatus while imaging the nearest neighbor keyframe, whether a virtual keyframe is to be added or not is determined. More specifically, a distance dist between the position derived in step S1020 and the position of the nearest neighbor keyframe is calculated, and if the distance dist is equal to or higher than a threshold Tt, the virtual keyframe is added in step S1240. Otherwise, the processing moves to step S1230 where the virtual keyframe addition is determined on the basis of an index different from that in step S1220.

In step S1230, the virtual keyframe addition may be determined on the basis of whether there is a sufficient overlap between the nearest neighbor keyframe and the current frame. More specifically, when all feature points on the nearest neighbor keyframe are projected on the image of the current frame, a rate of feature points projected on the image is calculated. If the rate is lower than a threshold Tp, it is determined that the virtual keyframe is to be added. The image of the current frame here is an image captured by the left camera of the stereo cameras.

Here, in order to determine whether feature points on the nearest neighbor keyframe are projected on the image of the current frame, the following processing is performed. It is assumed here a feature point to be processed has image coordinates $(u_k, v_k)$ on the nearest neighbor keyframe. First, with reference to the depth map D, a reciprocal number $1/Z$ of a depth Z of the feature point is read out. Next, the image coordinates $(u_k, v_k)$ and the intrinsic parameters $(f_x, f_y, c_x, c_y)$ of the camera are used to calculate three-dimensional coordinates $(X_k, Y_k, Z_k)$ in the imaging apparatus coordinate system of the nearest neighbor keyframe of the feature point. $(X_k, Y_k, Z_k)$ may be calculated by using Expression (1).

$$\begin{bmatrix} X_k \\ Y_k \\ Z_k \end{bmatrix} = Z \begin{bmatrix} (u_k - c_x)/f_x \\ (v_k - c_y)/f_y \\ 1 \end{bmatrix} \quad (1)$$

Next, the three-dimensional coordinates ($X_k, Y_k, Z_k$) in the imaging apparatus coordinate system of the nearest neighbor keyframe are converted to three-dimensional coordinates ($X_c, Y_c, Z_c$) in the imaging apparatus coordinate system of the current frame by using Expression (2).

$$\begin{bmatrix} X_c \\ Y_c \\ Z_c \\ 1 \end{bmatrix} = \begin{bmatrix} R_{wc} & t_{wc} \\ 0 & 1 \end{bmatrix}^{-1} \begin{bmatrix} R_{wk} & t_{wk} \\ 0 & 1 \end{bmatrix} \begin{bmatrix} X_k \\ Y_k \\ Z_k \\ 1 \end{bmatrix} \quad (2)$$

Here, $t_{wk}$ and $R_{wk}$ are a three-dimensional vector representing the position and a 3×3 rotation matrix representing the orientation, respectively, of a nearest neighbor keyframe in a world coordinate system. $t_{wc}$ and $R_{wc}$ are a three-dimensional vector representing the position and a 3×3 rotation matrix representing the orientation, respectively, of the imaging apparatus while capturing the current frame in a world coordinate system. Next, the three-dimensional coordinates ($X_c, Y_c, Z_c$) in the imaging apparatus coordinate system of the current frame are converted to the image coordinates ($u_c, v_c$) of the current frame by using Expression (3).

$$\begin{bmatrix} u_c \\ v_c \end{bmatrix} = \begin{bmatrix} f_x X_c/Z_c + c_x \\ f_y Y_c/Z_c + c_y \end{bmatrix} \quad (3)$$

A rate Rp of feature points having the thus calculated image coordinates ($u_c, v_c$) in the image of the current frame is calculated. If the rate Rp is lower than the threshold Tp, it is determined that there is not a sufficient overlap between the nearest neighbor keyframe and the current frame. Therefore, the processing moves to step S1240 where a virtual keyframe is added to prevent deterioration of accuracy and stability of the position and orientation measurement. Otherwise, the processing ends. Because the processing in step S1230 takes more time than that of the processing in step S1220, the addition determination in step S1230 is performed only if it is determined not to add a virtual keyframe in step S1220.

In step S1240, a virtual keyframe is generated. Details of processing for generating a virtual keyframe in step S1240 will be described below.

In step S1250, the generated virtual keyframe (including a grayscale image, a depth map, and a variance map of the current frame, and the position and orientation of the imaging apparatus while capturing the image) is added to the three-dimensional map held in the three-dimensional information holding unit 10. The processing in the flowchart in FIG. 5 ends.

Details of Processing for Generating Virtual Keyframe

Figure 6:
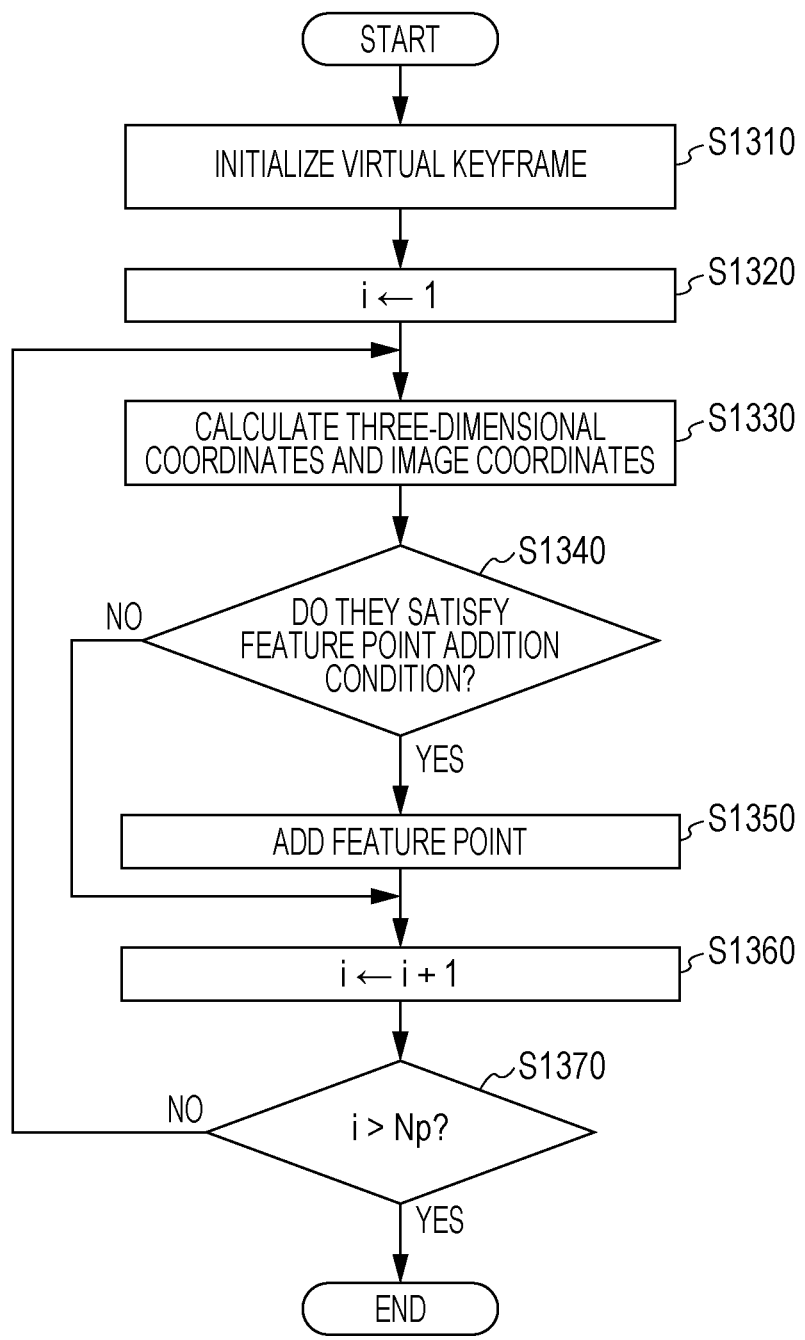
FIG. 6 is a flowchart illustrating a detail procedure for processing of generating a virtual keyframe.

FIG. 6 is a flowchart illustrating a detail procedure for processing of generating a virtual keyframe (step S1240). It is assumed here that Np feature points are held in the nearest neighbor keyframe selected in step S1210.

In step S1310, a virtual keyframe is initialized. More specifically, the values of the reciprocal numbers of the depths of pixels in the depth map held in the virtual keyframe are set to 0, and the values of variances of the reciprocal numbers of the depths of pixels in the variance map are set to a predetermined default value. In step S1320, a variable i designating a feature point on the nearest neighbor keyframe is set to one (1).

In step S1330, the three-dimensional coordinates ($X_c, Y_c, Z_c$) in the imaging apparatus coordinate system of the current frame at the ith feature point in the nearest neighbor keyframe and the image coordinates ($u_c, v_c$) of the current frame are calculated by the method described with reference to step S1230. The values calculated in step S1230 may be held and may also be used in step S1330.

In step S1340, whether the feature point having the image coordinates calculated in step S1330 is to be added to the virtual keyframe or not is determined. According to this embodiment, the feature point is added to the virtual keyframe if the following conditions are satisfied:

(1) Image coordinates ($u_c, v_c$) are present within the image of the current frame;
(2) A depth $Z_c$ is between preset upper and lower limit values of the depth; and
(3) A feature at the image coordinates ($u_c, v_c$) of the current frame satisfies a predetermined condition.

According to this embodiment, the feature may be a luminance value on the image. Here, the condition (3) is that a difference between a luminance value on the grayscale image of the nearest neighbor keyframe at the feature point to be processed and a luminance value at the image coordinates ($u_c, v_c$) of the grayscale image of the current frame is lower than a predetermined threshold Ti.

If the image coordinates ($u_c, v_c$) of the feature point are integer values, the luminance value of the corresponding pixel is used for the comparison. If the image coordinates are not integer values, a luminance value calculate by performing linear interpolation from luminance values of surrounding pixels may be used for comparison. If it is determined that the feature point is to be added in S1340, the processing moves to step S1350. If not, the processing moves to step S1360.

In step S1350, the feature point is added to the virtual keyframe image. First of all, the image coordinates ($u_c, v_c$) in the current frame are rounded to integers (($u_{c'}, v_{c'}$)), and the value $D(u_{c'}, v_{c'})$ of the reciprocal number of the depth of the corresponding pixel is referred.

(A) If $D(u_{c'}, v_{c'})$ is 0, the reciprocal number of the depth value $Z_c$ with reference to the imaging apparatus coordinate system of the current frame calculated in step S1330 is registered with $D(u_{c'}, v_{c'})$. With $V(u_{c'}, v_{c'})$ of the variance map, a variance calculated from the variance of the feature point in the nearest neighbor keyframe is registered.

(B) If $D(u_{c'}, v_{c'})$ is a value excluding 0, that is, the depth map and variance map of the corresponding pixel have been updated with another feature point, the following processing is performed. That is, if $1/Z_c$ is present within a range of $1\sigma$ of $D(u_{c'}, v_{c'})$, the feature point is stochastically regarded as an identical point, and the weighted average of $1/Z_c$ obtained by assigning the reciprocal number of the variance as a weight is registered with $D(u_{c'}, v_{c'})$. The weighted average of the variance is also registered with $V(u_{c'}, v_{c'})$. If $1/Z_c$ is outside the range of $1\sigma$ and is higher than $D(u_{c'}, v_{c'})$ (or at the front), $D(u_{c'}, v_{c'})$ is overwritten with $1/Z_c$. A variance calculated from the variance of the feature point in the nearest neighbor keyframe is registered with $V(u_{c'}, v_{c'})$.

In step S1360, 1 is added to i. The processing moves to step S1370. In step S1370, if i is higher than Np, it is determined that all of the feature points have been processed. The processing then moves to step S1380. Otherwise, the processing returns to step S1330, and the processing for generating a virtual keyframe continues.

According to the first embodiment, an image captured by the imaging apparatus while mixed reality is being experienced is added to the three-dimensional map as a virtual keyframe so that the range supporting the position-and-orientation measurement can be increased without deteriorating it accuracy and stability.

It should be understood that the imaging apparatus used for capturing an image is not limited to stereo cameras as described above but may be any camera which can capture an image in a physical space. For example, a monocular camera or three or more cameras may be used where the cameras are fixed rigidly and the relative positions and orientations between the cameras are known. The imaging apparatus is not limited to a camera which captures a color image but may be a camera which captures a grayscale image. A feature to be used for determination on whether a feature point is to be added to a virtual keyframe or not is not limited to a luminance value. In a case where the imaging apparatus is a camera which captures a color image, the determination on the feature point addition may be performed by comparing color values.

Any feature point on a keyframe may be used if it can be used for the position and an orientation deriving. For example, a feature point on a keyframe may be a pixel having a larger luminance gradient among pixels on a grayscale image. For example, a method by Newcombe et al. may be applied (refer to R. A. Newcombe, S. J. Lovegrove, A. J. Davison, "DTAM: Dense Tracking and Mapping in Real-Time," Proc. 13th International Conference on Computer Vision, pp. 2320-2327, 2011). In other words, all pixels on a keyframe may be handled as feature points.

The relocalization method for position and orientation measurement is not limited to image matching between a captured image and a keyframe but may be any method if the position and orientation of an imaging apparatus can be measured without requiring advance information regarding the position and the orientation. For example, every feature point detected on a captured image may be matched with a feature point detected on a keyframe, and a feature point correspondence obtained thereby may be used for initialization. Feature points and regions detected on a captured image are classified into a plurality of classes, a similar keyframe may be selected for initialization on the basis of the frequencies of the classes of feature points and regions.

According to the first embodiment, the processing for updating a three-dimensional map by using a current frame is performed, and, sequentially, the position and orientation in the next frame are derived. However, the three-dimensional map updating may not necessarily be performed sequentially but may be performed in parallel with the position and orientation deriving on the next frame. More specifically, a thread for deriving the position and orientation of each frame and a thread for updating a three-dimensional map may be performed separately and in parallel, the position and orientation deriving may be performed by using the latest three-dimensional map that is currently available.

According to the first embodiment, a depth map holds reciprocal numbers of depth values, and a variance map holds variances of the reciprocal numbers of the depth values. However, any data may be held in the depth map if the data can be converted to three-dimensional coordinates in an imaging coordinate system of a keyframe. For example, data such as a depth may be held in a depth map, or three-dimensional coordinates in an imaging coordinate system of a keyframe may be directly held therein.

According to the first embodiment, only an actual keyframe is selected for generating a virtual keyframe. However, any keyframe may be selected, and either an actual keyframe or a virtual keyframe may be selected. However, in order to prevent accuracy reduction in the position and orientation measurement, the type of keyframe selected as a nearest neighbor keyframe is held in a virtual keyframe as an attribute.

A virtual keyframe whose nearest neighbor keyframe is a virtual keyframe may be disabled to be selected as a nearest neighbor keyframe of another virtual keyframe. Alternatively, a keyframe with a nearest neighbor keyframe whose nearest neighbor keyframe is a virtual keyframe may be disabled to be selected as a nearest neighbor keyframe in consideration of generations of virtual keyframes.

Any degree of contribution of a feature point on a virtual keyframe to the position-and-orientation measurement may be defined if a larger weight is assigned to a feature point satisfying a condition for adding the feature point to a virtual keyframe and a smaller weight is assigned to a feature point not satisfying the condition. For example, as in the first embodiment, if a feature point does not satisfy a condition for adding to a virtual keyframe, the feature point may not be registered with the virtual keyframe. The weight to be assigned may be reduced as the luminance difference between feature points in a nearest neighbor keyframe and in a current frame increased.

According to the first embodiment, the position and orientation of a previous frame are used as prediction values for the position and orientation in the current frame. However, the prediction values for the position and orientation in the current frame may be any values close to the actual position and orientation in the current frame. For example, they may be a position and an orientation predicted from a movement model relating to a uniform velocity movement or a uniform acceleration movement. The position and orientation in the current frame may be predicted from a position, a change in position, an orientation or a change in orientation position measured by a sensor other than a camera, such as a sensor which measures a change in position and a sensor which measures an orientation or a change in orientation.

According to the first embodiment, for determination on whether a feature point is to be added to a virtual keyframe or not, a difference in luminance value between feature points in a nearest neighbor keyframe and the virtual keyframe is used so that an optically matched feature point can only be added to the virtual keyframe. According to a second embodiment, a difference in depth at a feature point is used in a case where an imaging apparatus being stereo cameras is applied, a geometrically matched feature point can only be added to a virtual keyframe. This can increase the accuracy and stability of position-and-orientation measurement using a virtual keyframe.

Because the configuration of an information processing device according to the second embodiment is the same as the information processing device 1 according to the first embodiment, any repetitive description will be omitted. Because the first and the second embodiments are different only in processing in step S1340 in FIG. 6, the processing in step S1340 will be described mainly.

The processing in step S1340 according to the second embodiment adds a feature point to a virtual keyframe if the following conditions are satisfied:

(1) Image coordinates $(u_c, v_c)$ are present in an image of a current frame;
(2) A depth $Z_c$ is between preset upper and lower limit values of the depth; and
(3) A feature at the image coordinates $(u_c, v_c)$ of the current frame satisfies a predetermined condition.

According to the second embodiment, a depth of a feature point is used as the feature. The depth of the feature point is calculated on the basis of stereo images captured by the stereo cameras. More specifically, a point $(u_R, v_R)$ on an image captured by a right camera corresponding to image coordinates $(u_c, v_c)$ on an image captured by a left camera of a current frame is searched. On an epipolar line on an image captured by the right camera, which is calculated from the image coordinates $(u_c, v_c)$ and intrinsic and extrinsic parameters of the stereo cameras, a point having a smallest sum of squared errors in luminance in an N×N pixel region may be searched so that coordinates $(u_R, v_R)$ of the corresponding point can be obtained.

Furthermore, on the basis of $(u_c, v_c)$, $(u_R, v_R)$, and the intrinsic and extrinsic parameters of the stereo cameras, a depth $Z_c'$ of the feature point in the imaging apparatus coordinate system of the current frame is obtained by applying a triangulation method. The feature point is added to the virtual keyframe if the conditions as described and the following condition (3) are satisfied:
(3) The difference between the depth $Z_c'$ obtained as described above of the feature point and the depth $Z_c$ in the imaging apparatus coordinate system of the current frame of the feature point in the nearest neighbor keyframe is lower than a predetermined threshold Td. If it is determined in step S1340 that the feature point is to be added, the processing moves to step S1350. If not, the processing moves to step S1360.

According to the second embodiment, as described above, an image captured by the imaging apparatus while mixed reality is being experienced is added to the three-dimensional map as a virtual keyframe so that the range supporting the position-and-orientation measurement can be increased without deteriorating it accuracy and stability. Furthermore, a point having a smaller difference between a depth held in a nearest neighbor keyframe and a depth obtained in a current frame is only added to a virtual keyframe so that highly accurate and stable position-and-orientation measurement using a virtual keyframe can be implemented.

According to the second embodiment, a feature point having a small difference in depth of the point is added to a virtual keyframe. However, the method for selecting a feature point to be added to a virtual keyframe is not limited thereto, but a feature point having a small difference in depth of the feature point and having a difference in luminance value as in the first embodiment may be added to a virtual keyframe. In this case, a feature point satisfying that a difference between a depth $Z_c'$ of the feature point in a current frame and a depth $Z_c$ in an imaging apparatus coordinate system of the current frame of the feature point in the nearest neighbor keyframe is lower than a threshold Td and that a difference in luminance value therebetween is lower than a threshold Ti is added to a virtual keyframe.

The second embodiment assumes that stereo cameras are used as an imaging apparatus. However, the imaging apparatus to be used is not limited to stereo cameras but may be any other imaging apparatus if it is capable of measuring a depth of a feature point. For example, a depth camera capable of capturing a depth image or an RGBD camera capable of obtaining a color image and a depth image may be used instead. Alternatively, a three-dimensional measurement apparatus may be used, such as a LiDAR, which is capable of measuring three-dimensional coordinates of a set of points on a surface of a measurement subject, instead of a depth image. Alternatively, an imaging apparatus may be used which includes a depth camera or a three-dimensional measurement apparatus fixed to a camera configured to capture a grayscale image or a color image.

According to the aforementioned embodiments, a virtual keyframe is generated on the basis of a nearest neighbor keyframe. According to the third embodiment, a virtual keyframe is generated by converting three-dimensional coordinates in a world coordinate system of a feature point, which are held in a feature point database, to three-dimensional coordinates in a direct current frame. Thus, a virtual keyframe can be generated without an influence of a position-and-orientation measurement error of a nearest neighbor keyframe, which can thus prevent accuracy reduction of position and orientation measurement.

Because the configuration of an information processing device according to the third embodiment is the same as the information processing device 1 according to the first embodiment, any repetitive description will be omitted. The first and second embodiments and the third embodiment are different only in how the three-dimensional information holding unit 10 holds a three-dimensional map and in processing in steps S1320 and S1330 in FIG. 6. How the three-dimensional information holding unit 10 holds a three-dimensional map and processing in steps S1320 and S1330 will be described in detail below.

How Three-Dimensional Map is Held

The three-dimensional information holding unit 10 is configured to hold a feature point database holding three-dimensional coordinates in a world coordinate system of feature points in addition to a set of keyframes. The feature point database may be generated by, for example, a method by Furukawa et al. (refer to Y. Furukawa, B. Curless, S. M. Seitz, R. Szeliski, "Reconstructing Building Interiors from Images," Proc. 12th International Conference on Computer Vision, pp. 80-87, 2009.)

According to the method by Furukawa et al., in response to input of many images, Structure-from-motion and Multi-View Stereo are performed on a feature point database to implement tight three-dimensional reconstruction thereof. Those tightly reconstructed three-dimensional points along with the three-dimensional coordinates are registered with the feature point database.

Virtual Keyframe Generation

According to the third embodiment, Np feature points are registered with the feature point database. In step S1320, a variable i for designating a feature point in the feature point database is set to 1.

In step S1330, three-dimensional coordinates $(X_c, Y_c, Z_c)$ in an imaging apparatus coordinate system of a current frame of the ith feature point in the feature point database and image coordinates $(u_c, v_c)$ of the current frame are calculated. First, three-dimensional coordinates $(X_w, Y_w, Z_w)$ in a world coordinate system of the feature point are converted to three-dimensional coordinates $(X_c, Y_c, Z_c)$ in a coordinate system of the imaging-apparatus of a current frame by using Expression (4).

$$\begin{bmatrix} X_c \\ Y_c \\ Z_c \\ 1 \end{bmatrix} = \begin{bmatrix} R_{wc} & t_{wc} \\ 0 & 1 \end{bmatrix}^{-1} \begin{bmatrix} X_w \\ Y_w \\ Z_w \\ 1 \end{bmatrix} \quad (4)$$

$t_{wc}$ and $R_{wc}$, as described above, are a three-dimensional vector representing a position and a 3×3 rotation matrix representing an orientation, respectively, of the imaging apparatus while capturing current frame in the world coordinate system. Next, Expression (3) is used to convert the three-dimensional coordinates $(X_c, Y_c, Z_c)$ in the imaging-apparatus coordinate system of the current frame to the image coordinates $(u_c, v_c)$ of the current frame.

According to the third embodiment, as described above, an image captured by the imaging apparatus while mixed reality is being experienced is added to the three-dimensional map as a virtual keyframe so that the range supporting the position-and-orientation measurement can be increased without deteriorating it accuracy and stability. According to the third embodiment, a virtual keyframe is generated on the basis of a feature point database holding three-dimensional coordinates in a world coordinate system of a feature point so that accuracy reduction due to a position-and-orientation measurement error of the keyframe can be prevented.

The three-dimensional map may further hold a mesh model of a scene. In a case where a mesh model is held, the visibility of a feature point may be determined to determine whether the feature point can be added to a virtual keyframe or not. If the feature point is not hidden by the mesh, it may be determined that the feature point can be added.

The feature point database may not necessarily be generated on the basis of many images but may only be required to be usable for measurement of three-dimensional coordinates of a feature point. For example, a three-dimensional scanner such as a LiDAR may be used for direct three-dimensional measurement of a scene. The feature point database may be generated on the basis of design data without performing three-dimensional measurement. Alternatively, the feature point database may be generated from a three-dimensional model that is generated by performing texture mapping on an image captured by a camera to three-dimensional information obtained from three-dimensional measurements or design data.

According to the aforementioned embodiments, a virtual keyframe is generated by using a single keyframe (nearest neighbor keyframe). However, one keyframe is not necessarily required for generating a virtual keyframe, but a plurality of keyframes may be used for generating a virtual keyframe.

Figure 7:
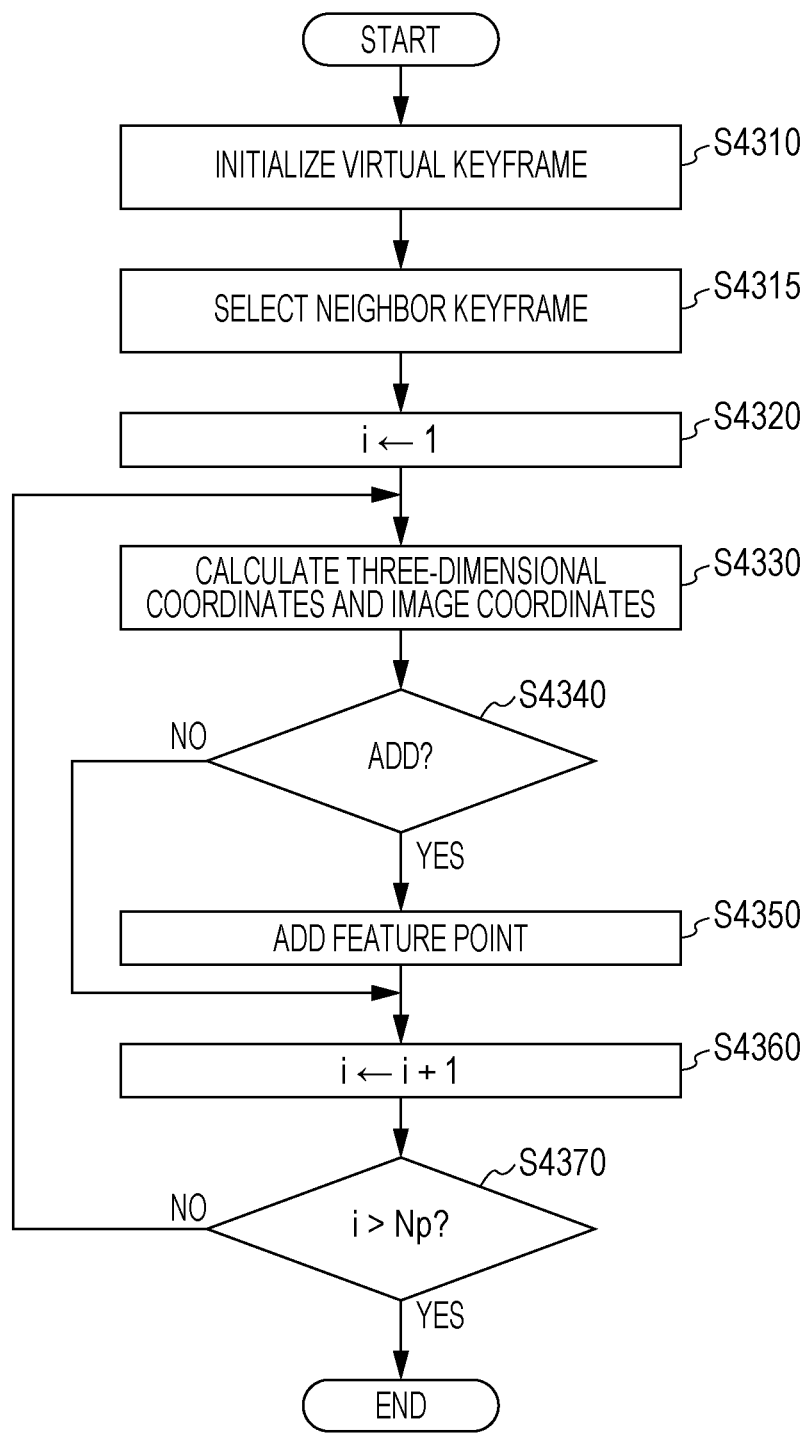
FIG. 7 is a flowchart illustrating detail procedure for processing of generating a virtual keyframe according to a variation example.

FIG. 7 is a flowchart illustrating a detail procedure for virtual keyframe generation processing according to a variation example. This flowchart corresponds to that in FIG. 6 according to the first embodiment.

Because the processing in steps S4310, S4320, S4340, S4350, S4360, and S4370 is the same as the processing in steps S1310, S1320, S1340, S1350, S1360, S1370 in FIG. 6, any repetitive description will be omitted.

In step S4315, one or more actual keyframes (neighbor keyframes) is or are selected each of which holds a position and an orientation close to the position and orientation derived in step S1050. Here, keyframes are selected which have a difference in position lower than a threshold Ts and hold Ns or more feature points on the keyframes projected on the current frame by the method as in step S1230 according to the first embodiment. This variation example assumes that the total number of feature points on a selected keyframe is equal to Np.

In step S4330, the three-dimensional coordinates $(X_c, Y_c, Z_c)$ in the imaging-apparatus coordinate system of the current frame of each of the feature points of the neighbor keyframes and the image coordinates $(u_c, v_c)$ of the current frame are calculated by the method as in step S1230. However, they are calculated by using the position and orientations of the neighbor keyframes instead of the position and orientation of the nearest neighbor keyframe.

According to this variation example, as described above, a virtual keyframe is generated by using a plurality of keyframes. Thus, even when a keyframe is to be generated between existing keyframes, sufficient feature points can be added. Therefore, highly accurate and stable position-and-orientation measurement can be implemented.

The information processing device according to any one of the aforementioned embodiments may further include a three-dimensional map display unit. The three-dimensional map display unit may be an HMD being the display unit 70 to be worn by a user or any other display. The three-dimensional map display unit is configured to display information regarding a keyframe included in a three-dimensional map.

Figure 9:
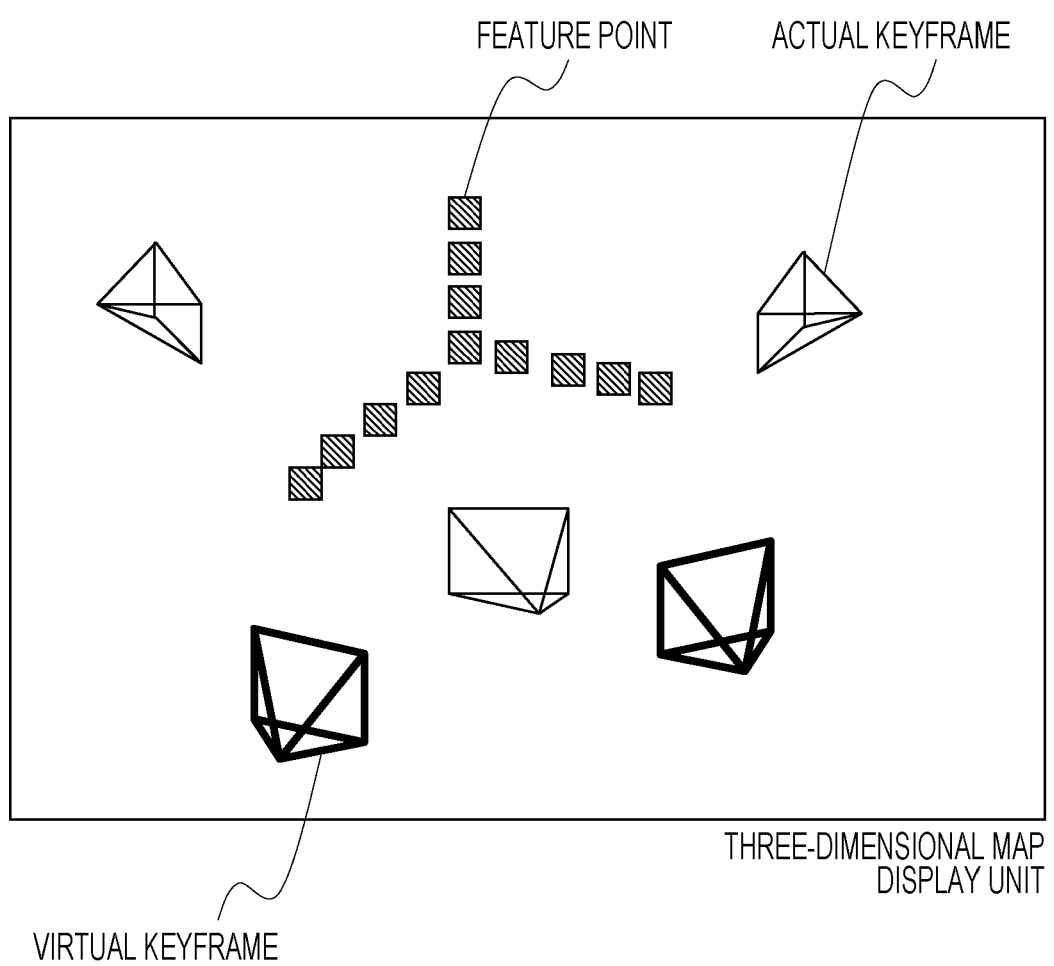
FIG. 9 illustrates an example screen displayed by a three-dimensional map display unit.

FIG. 9 illustrates a screen example to be displayed by the three-dimensional map display unit. As illustrated in FIG. 9, the screen displays a virtual object representing a keyframe included in a three-dimensional map and a feature point on the keyframe. The virtual object representing a keyframe is displayed such that it can represent the position and orientation of the imaging apparatus while capturing the keyframe in a physical space, and the actual keyframe and the virtual keyframe may be display in different colors.

A nearest neighbor keyframe used for deriving the position and orientation of a current frame may also be displayed in a different color. A virtual object representing the position and orientation of the imaging apparatus while capturing the current frame may be displayed. The three-dimensional coordinates of the feature point on the keyframe are converted to three-dimensional coordinates in a world coordinate system predefined in a physical space and are drawn as a point in the world coordinate system. The color or luminance on the captured image may directly be used as color of the drawn feature point, or a value obtained by converting a depth (Z coordinate) to a color in the imaging-apparatus coordinate system of the keyframe. Feature points on partial keyframes such as a nearest neighbor keyframe of the current frame or feature points on all keyframes may be drawn. The relationship of connection between a virtual keyframe and the neighbor/nearest neighbor keyframe used for generating the virtual keyframe may be represented by a segment connecting positions of the virtual objects.

According to the aforementioned embodiments, an image captured by the imaging apparatus in addition to prepared keyframes are added to a three-dimensional map as a virtual keyframe image so that the range supporting the position-and-orientation measurement can be increased without deteriorating it accuracy and stability.

In the addition of a feature point to a virtual keyframe, luminances or distances on images of feature points may be compared so that a feature point being highly optically and geometrically consistent may only be added. Thus, highly accurate and stable position-and-orientation measurement can be performed on the imaging apparatus.

Furthermore, a virtual keyframe may be generated on the basis of a feature point database holding three-dimensional coordinates in a world coordinate system of feature points to prevent accuracy reduction of the position and orientation measurement due to a position-and-orientation measurement error with neighbor keyframes.

The three-dimensional map held by the three-dimensional information holding unit 10 according to any of the aforementioned embodiments may be anything represented by a set of keyframes including captured images, positions and orientations of the imaging apparatus capturing the images, and three-dimensional information on geometric features in a physical space. For example, the three-dimensional information on geometric features in a physical space may be three-dimensional coordinates in a coordinate system with reference to the physical space or three-dimensional coordinates in a coordinate system with reference to the imaging apparatus whose positions and orientations in the physical space while capturing are known.

The camera which captures an image input by the image input unit according to any of the aforementioned embodiments may be any camera configured to capture an image in a physical space. For example, it may be a camera configured to capture a grayscale image or a camera configured to capture a color image. Furthermore, the imaging apparatus may be one camera or may include a plurality of cameras as in stereo cameras.

The position/orientation derivation unit according to any of the aforementioned embodiments may derive the position and orientation of a camera while capturing an input image on the basis of the input image and a three-dimensional map. For example, the position and the orientation may be derived by using a difference in luminance value as an evaluation function, or the position and the orientation may be derived by using a difference in position on an image of a feature point as an evaluation function.

The three-dimensional map updating unit according to any of the aforementioned embodiments may generate a virtual keyframe by using an image from which the position/orientation derivation unit derives the position and orientation of the imaging apparatus while capturing and add the generated virtual keyframe to a three-dimensional map. For example, three-dimensional coordinates of a feature point in an existing three-dimensional map may be converted on the basis of the derived position and orientation to calculate three-dimensional coordinates of the feature point on a virtual keyframe. The three-dimensional coordinates of the feature point in the existing three-dimensional map may refer to a world coordinate system set in a physical space or refer to a coordinate system of the imaging apparatus while capturing a keyframe.

The position on the input image, which is calculated on the basis of the derived position and orientation, may be calculated to determine the degree of contribution of the feature point in the position and orientation deriving on the basis of an attribute on the input image. The attribute on the input image may be a luminance or a distance.

According to the aforementioned embodiments, even when an imaging apparatus leaves a range where a virtual point of view is generated in advance, the position-and-orientation measurement can be implemented without deteriorating its accuracy and stability.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-038042, filed Feb. 29, 2016, which is hereby incorporated by reference herein in its entirety.

What is claimed is:

1. An information processing apparatus configured to store, in advance, pieces of reference data including a captured image, a position and an orientation of an imaging apparatus when the image is captured, three-dimensional information of a feature in a space corresponding to the image, and an attribute of the feature, wherein the captured image, the position and the orientation, the three-dimensional information, and the attribute are associated with each other, the information processing apparatus comprising:
   one or more processors; and
   a memory storing executable instructions, which when executed by the one or more processors, cause the information processing apparatus to:
      input an image captured by the imaging apparatus;
      derive a position and an orientation of the imaging apparatus capturing the input image on the basis of the pieces of reference data stored and the input image;
      determine whether the input image, as a new piece of reference data, is to be added on the basis of the derived position and orientation and the pieces of reference data;
      decide a feature point that is to be registered into the new piece of reference data in a case where the determination determines that the new piece of reference data is to be added, wherein the feature point that is to be registered is a feature point according to which converted coordinates obtained by converting three-dimensional coordinates of a feature point in a coordinate system of at least one piece of reference data selected based on the derived position and the derived orientation into three-dimensional coordinates in a coordinate system of the input image are included in the input image and according to which the attribute of the feature of a feature point associated with the selected at least one piece of reference data and the attribute of the feature of the feature point in the input image are similar to each other; and
      add the new piece of reference data and update the pieces of reference data.

2. The information processing apparatus according to claim 1, wherein the executable instructions, when executed by the one or more processors, cause the information processing apparatus to:
in a case where a position and an orientation of the imaging apparatus in a previous frame have been obtained, determine the position and the orientation in the previous frame as prediction values for a present position and orientation of the imaging apparatus.

3. The information processing apparatus according to claim 1, wherein the executable instructions, when executed by the one or more processors, cause the information processing apparatus to:
in a case where a position and an orientation of the imaging apparatus in a previous frame have not been obtained, perform relocalization to obtain prediction values for a present position and orientation of the imaging apparatus.

4. The information processing apparatus according to claim 1, wherein the executable instructions, when executed by the one or more processors, cause the information processing apparatus to:
select a predetermined or smaller number of feature points from the selected at least one piece of reference data; and
correct prediction values for a present position and orientation of the imaging apparatus by using the selected feature points.

5. The information processing apparatus according to claim 1, wherein the executable instructions, when executed by the one or more processors, further cause the information processing apparatus to:
calculate a distance between the derived position of the imaging apparatus and the position of the imaging apparatus in the selected at least one piece of reference data,
wherein a determination whether the new piece of reference data is to be added or not is determined on the basis of the distance.

6. The information processing apparatus according to claim 1, wherein the executable instructions, when executed by the one or more processors, further cause the information processing apparatus to:
in a case where feature points in the selected at least one piece of reference data are projected on the input image, calculate a rate of feature points to be projected on the image,
wherein it is determined whether to generate a piece of reference data or not on the basis of the rate.

7. The information processing apparatus according to claim 1, wherein the executable instructions, when executed by the one or more processors, cause the information processing apparatus to:
sequentially designate feature points in the selected at least one piece of reference data;
calculate three-dimensional coordinates and image coordinates of each of the designated feature points in a current frame in a coordinate system with reference to the imaging apparatus;
determine whether the designated feature point is to be added or not on the basis of the three-dimensional coordinates and the image coordinates; and
add, to the pieces of reference data, the feature point determined to be added.

8. The information processing apparatus according to claim 1,
wherein two or more pieces of reference data are sequentially selected from the pieces of reference data, and
wherein prediction values for a present position and orientation of the imaging apparatus are sequentially corrected by using feature points in the sequentially selected pieces of reference data to obtain the derived position and orientation.

9. The information processing apparatus according to claim 1, wherein the attribute of the feature is included in the piece of reference data, and wherein the executable instructions, when executed by the one or more processors, further cause the information processing apparatus to:
calculate a position of the feature on the input image on the basis of the derived position and orientation and three-dimensional information of the feature in the selected at least one piece of reference data; and
determine a degree of contribution of the feature in the piece of reference data to be generated by comparing the attribute of the feature and an attribute of the position of the feature on the input image,
wherein the deriving derives a position and an orientation of the imaging apparatus by using the pieces of updated reference data and the determined degree of contribution.

10. The information processing apparatus according to claim 9, wherein the attribute of the feature includes a luminance and a color.

11. The information processing apparatus according to claim 9, wherein the attribute of the feature includes a distance with reference to the imaging apparatus.

12. The information processing apparatus according to claim 1,
wherein the attribute is a luminance value of the feature.

13. An information processing method for an information processing apparatus configured to store, in advance, pieces of reference data including a captured image, a position and an orientation of an imaging apparatus when the image is captured, three-dimensional information of a feature in a space corresponding to the image, and an attribute of the feature, wherein the captured image, the position and the orientation, the three-dimensional information, and the attribute are associated with each other, the method comprising:
inputting an image captured by the imaging apparatus;
deriving a position and an orientation of the imaging apparatus capturing the input image on the basis of the pieces of reference data stored and the input image;
determining whether the input image, as a new piece of reference data, is to be added on the basis of the derived position and orientation and the pieces of reference data;
deciding a feature point that is to be registered into the new piece of reference data in a case where it is determined that the new piece of reference data is to be added, wherein the feature point that is to be registered is a feature point according to which converted coordinates obtained by converting three-dimensional coordinates of a feature point in a coordinate system of at least one piece of reference data selected based on the derived position and the derived orientation into three-dimensional coordinates in a coordinate system of the input image are included in the input image and according to which the attribute of the feature of a feature point associated with the selected at least one piece of reference data and the attribute of the feature of the feature point in the input image are similar to each other; and adding the new piece of reference data and updating the pieces of reference data.

14. A non-transitory computer-readable storage medium storing a program including instructions, which when executed by a computer of an information processing apparatus configured to store, in advance, pieces of reference data including a captured image, a position and an orientation of an imaging apparatus when the image is captured, three-dimensional information of a feature in a space corresponding to the image, and an attribute of the feature, wherein the captured image, the position and the orientation, the three-dimensional information, and the attribute are associated with each other, cause the information processing apparatus to:

input an image captured by the imaging apparatus;
derive a position and an orientation of the imaging apparatus capturing the input image on the basis of the pieces of reference data stored and the input image;
determine whether the input image, as a new piece of reference data, is to be added on the basis of the derived position and orientation and the pieces of reference data;
decide a feature point that is to be registered into the new piece of reference data in a case where the determination determines that the new piece of reference data is to be added, wherein the feature point that is to be registered is a feature point according to which converted coordinates obtained by converting three-dimensional coordinates of a feature point in a coordinate system of at least one piece of reference data selected based on the derived position and the derived orientation into three-dimensional coordinates in a coordinate system of the input image are included in the input image and according to which the attribute of the feature of a feature point associated with the selected at least one piece of reference data and the attribute of the feature of the feature point in the input image are similar to each other; and
add the new piece of reference data and update the pieces of reference data.

* * * * *